Oct. 29, 1963         E. PARKER         3,109,063
CATHODE RAY TUBE DISPLAY APPARATUS
Filed Dec. 13, 1960
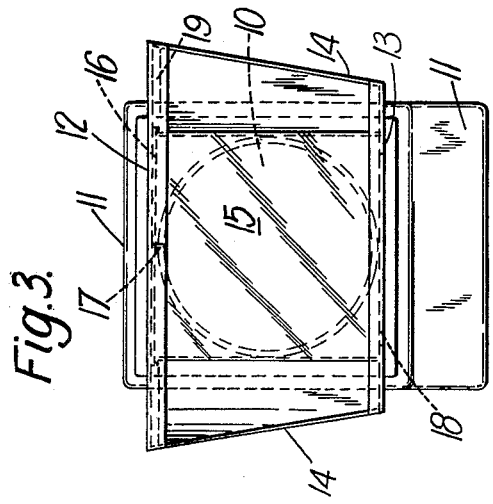
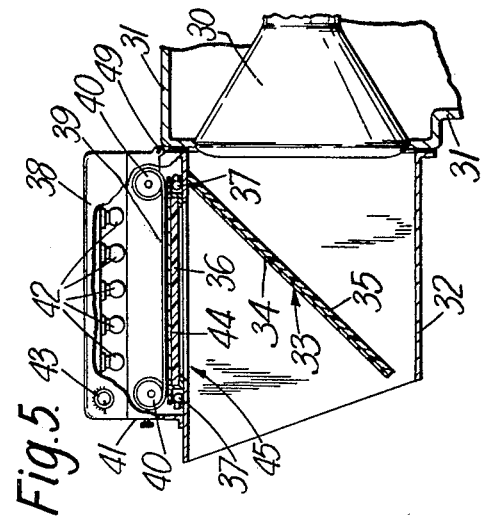
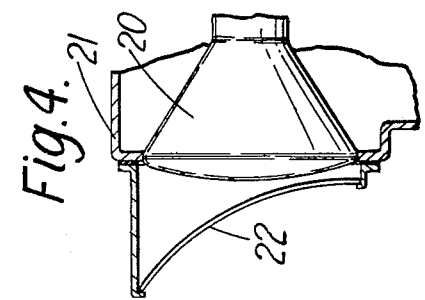
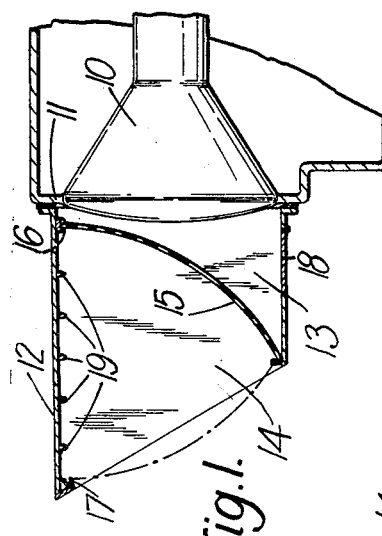
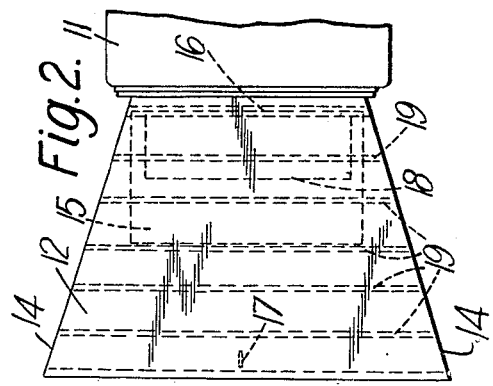

3,109,063
CATHODE RAY TUBE DISPLAY APPARATUS
Eric Parker, London, England, assignor to Decca Limited, a British company
Filed Dec. 13, 1960, Ser. No. 75,541
Claims priority, application Great Britain Sept. 22, 1960
10 Claims. (Cl. 178—7.85)

This invention relates to cathode ray tube display apparatus. For some purposes, for example in marine radar displays, it is often required to view a cathode ray tube display screen in high ambient light conditions. It is a common practice in such cases to provide a viewing hood around the screen, the hood being so shaped that the observer can put his head closely against an aperture in the hood and thereby be able to see the screen whilst excluding substantially all the light from entering through the aperture. Such a hood, however, has a number of disadvantages. Particularly in a ship which may be rolling it is not physically convenient to keep one's head steady in the viewing aperture and the hood may produce an unpleasant feeling of confinement. More important, however, only one person at a time can view the screen and this makes any discussion about the display difficult to conduct. If one tries to look at such a display without holding the head closely against the aperture, a bright reflection is obtained from the screen of the tube of the viewer's own face and other external objects because these are brightly illuminated by the external ambient light.

According to this invention, cathode ray tube display apparatus comprises a cathode ray tube with a circular polarising filter in front of the display screen the filter being so arranged that a viewer cannot see any reflection from the surface of the filter of his own face. The filter may be curved for example to give reflections only from the floor or other objects in front of and below the cathode ray tube screen.

Preferably, however, a hood is provided extending around the filter, the filter being so shaped and positioned within the hood that any reflection from the surface of the filter seen by a viewer looking from outside the hood through the filter to the display screen comes from the inside of the hood. The inside of the hood will normally be in shadow and is preferably made a black surface. Reflections of the inside of the hood thus do not appreciably affect the visibility of the display on the cathode ray tube screen. The filter, being a circular polariser, prevents any reflections being obtained from the face of the cathode ray tube screen or from any protective screen or transparent plotting surface which may be provided in front of the tube but behind the filter. It is thus possible for an observer to see the display on the screen of the tube clearly without any disturbing reflections even although the observer does not put his face closely against the outer part of the hood.

It will be readily apparent that there are many forms of shapes which might be employed for the filter so that only reflections from the inside of the hood are obtained. A sufficient requirement is that all normals to that surface of the filter which is seen by the observer should extend from the filter to the inside surface of the hood. The filter may be formed as part of a cylinder with the axis horizontal and lying just within the top outer edge of the hood. The filter will then curve from a plane parallel or nearly parallel to the screen of the tube at the top of the screen downwardly and outwardly away from the screen. Such a filter may very conveniently be hinged to the hood for example along the upper edge of the filter so that it can be swung out of the way and secured by a suitable clip within the hood which may be suitably shaped for this purpose. A cylindrically curved filter as described above has the advantage that access to the screen of the tube, for example for writing on the screen, can readily be obtained by inserting the hand beneath the front edge of the filter.

A curved filter as described above in many cases is a particularly convenient shape of filter for the purpose of avoiding reflections. However, a flat filter may be desirable in some cases since this permits of the possibility of using the filter surface as a partial reflector for superimposing information in the form of a virtual image on the screen of the cathode ray tube and, according to a further feature of the invention, the outer surface of the filter may be made substantially flat and an illuminated information carrying member may be positioned so that, by reflection from the outer surface of the filter, a virtual image of the information carrying member is superimposed on and substantially coincident with the screen of the cathode ray tube. The information carrying member may comprise an edge illuminated transparent member; such a member may be a rotatable member carrying a marking or markings to form an adjustable bearing marker or markers or may be a transparent member having a range and bearing graticule on one face. Alternatively or additionally the information carrying member may comprise a translucent chart illuminated from the side remote from the filter. Such a translucent chart can be used in conjunction with a transparent information carrying member, the transparent member being put between the chart and the filter. The surfaces of the chart and the information carrying member may be closely adjacent so that it is readily possible to make a virtual image of both the chart and the information carrying member substantially coincident with the screen of the tube thereby avoiding parallax effects. If the screen of the tube is curved, a correcting lens may be employed to ensure that the virtual image coincides with the curved surface of the screen over the whole area thereof.

A circular polarising filter need have only a very small thickness and is commonly made as a very thin film. For practical purposes, therefore, no problem arises from reflections from the two surfaces of the film. Such a thin film, however, would generally have to be supported on a transparent support plate, for example a sheet of glass or of a polymethyl methacrylate resin. Provided the circular polarising filter is on the outer surface of the support plate, then no problems arise from reflections of the chart or other information carrying member from the far surface of the support plate, since such reflections would not be visible to an observer due to the presence of the circular polarising filter. Preferably, however the circular polarising filter is bonded to the support plate with an optical cement and then no such problems of reflection from two surfaces will arise, no matter on which side of the support plate is the filter positioned. This arrangement, therefore, using a circular polarising filter as a semi-reflecting surface for superposing an image on a cathode ray tube display constitutes a substantial advantage over known types of chart superpositioning apparatus using half-silvered mirrors since the circular polarising filter prevents the undesired reflections from the second surface of the reflecting plate.

If chart information is to be superimposed as described above, preferably the chart has white or light coloured markings on a black or dark surface. This ensures that only the required markings produce light images, thereby minimising interference with the visibility of the radar display.

The chart may be mounted so that its position can be adjusted to enable the chart and display to be brought into coincidence. If the above described arrangement employing a chart is used with true motion radar equipment on a ship or other craft, conveniently the display can be adjusted to coincide with the chart and thus a series of charts, partially overlapping in the area they cover may be used in succession, each chart being kept stationary. For example the series of charts may be mounted on rollers for traversing in the general direction of movement of the vessel so that as the vessel proceeds and a display is periodically re-set, the next successive chart can be moved into position by turning the rollers. The chart mounting may be adjustable laterally for aligning the display as necessary in that direction. Conveniently the charts are mounted in a removable chart holder to permit of ready interchange of different chart rolls.

If the flat filter is employed as described above for superimposing a virtual image on the cathode ray tube display screen conveniently the filter is arranged in a plane at substantially 45° to the general plane of the screen of the display tube and the information carrying member is arranged in a plane at twice this angle to the general plane of the screen of the display tube. In marine radar apparatus, it is convenient to use a hood, as previously described, in conjunction with a cathode ray tube screen in a vertical plane and in this case the information carrying member is preferably arranged above an aperture in the top surface of the hood. If a transparent member is used as an information carrying member or as a support surface below the chart, any markings written on the upper surface of this transparent member will appear as a virtual image without reversal on the screen of the display tube and this is therefore a convenient arrangement for superimposing hand-written markings on the display.

The following is a description of one embodiment of the invention, reference being made to the accompanying drawings in which:

FIGURE 1 is a sectional elevation through part of a cathode ray tube display apparatus;

FIGURE 2 is a plan view of the apparatus of FIGURE 1;

FIGURE 3 is a front view of the apparatus of FIGURE 1;

FIGURE 4 is a side elevation of another embodiment of the invention; and

FIGURE 5 is a side elevation partly in section of yet another embodiment of the invention.

Referring to FIGURES 1, 2 and 3 of the drawings, a cathode ray tube 10 is mounted in a cabinet or other housing 11. Secured on the front of the cabinet 11 is a hood having parallel top and bottom surfaces 12, 13 and outwardly flared side surfaces 14. The hood closely abuts against the cabinet 11 of the display apparatus around the tube screen to form an assembly which is light-tight apart from the open outer end forming a viewing aperture. The inside of the hood has a black surface. Mounted in the hood is a circular polarising filter 15 which is formed as a cylindrically curved sheet. This circular polariser 15 may comprise a linear polariser together with a quarter wave plate arranged to retard light waves polarised at an angle of 45° to the plane of polarising of light transmitted by the linear polariser. The circular polariser is concave viewed from the outside and its axis is horizontal and lies just inside the hood near the top outer edge thereof. The circular polarising filter 15 at its top edge lies just in front of the tube screen and is hinged to the top surface 12 of the hood by a hinge 16 permitting the filter to be lifted out of use if necessary. When not in use, the filter 15 is held against the top surface 12 of the hood by means of a spring clip 17. The door 18, which may be a hinged door as shown in the drawings or a sliding door, is provided in the bottom surface 13 of the hood to permit of inserting the hand behind the filter 15 for writing on the screen of the cathode ray tube 10.

With the construction shown in FIGURES 1, 2 and 3 of the drawings, a viewer looking through the hood will not see any bright reflections from the surface of the screen of the tube 10 since the circular polarising filter 15 will, in the known manner, prevent the transmission of reflected light back to the viewer. No distracting reflections will be obtained from the surface of the filter 15 since the shape of the filter prevents the reflection to the viewer of reflections from anything but the black inside surface of the hood. By flaring the sides outwardly as shown in FIGURE 2, it is readily possible for two or more viewers to look at the screen of the tube 10 simultaneously. If desired, the top and bottom surfaces may also be flared outwardly. In some cases, however, it may be preferred to flare the sides and possibly the top and bottom surfaces of the hood inwardly to reduce the size of the filter required.

If there is a very strong light behind the observer this light may be reflected by the filter 15 onto the top surface 12 of the hood. This surface, provided it is absolutely black and non-reflecting, would not, even if so illuminated, give any disturbing reflections as a virtual image on the screen of the cathode ray tube 10. It has been found however that, should the inside surface of the hood not be absolutely black, provided it is formed with a number of transverse ribs 19 extending the width of the hood from side to side thereof, these ribs effectively prevent any disturbing reflections being visible to an observer looking at the tube screen through the filter.

The display apparatus of FIGURES 1, 2 and 3 may be a marine radar plan position display. In some cases, for example, a television display, the external lighting may not be so strong and it may be possible to dispense with the hood using only the circular polarising filter as shown in FIGURE 4.

Referring to FIGURE 4 there is shown a cathode ray display tube 20 in a housing 21 with a concave circular polarising filter 22 arranged in front of the display screen. The filter is conveniently formed in a circular arc and is positioned so that a viewer looking normally to the display screen will not see any reflection of his own face but only reflections of the floor or other objects in front of and below the display screen. Thus there will generally be no disturbing reflections of any bright lights or windows seen by the viewer. The filter may conveniently be carried on a support 23 extending forwardly from the housing 21 above the top of the screen and may be hinged to or detachable from the support if desired. It has been found that such a circular polarising filter in front of a television screen gives to the viewer some sense of depth to the picture.

FIGURE 5 illustrates a construction in which a cathode ray tube 30 in a housing 31 is provided with a hood 32 and a flat circular polarising filter 33. This circular polarising filter is arranged for superimposing a virtual image on the screen of the display tube and the circular polarising filter is formed of a thin sheet 34 of circular polarising material supported on a rigid plate 35 of glass or polymethyl methacrylate resin, the thin sheet 34 constituting the circular polarising element being on the outer surface of the support plate 35. The filter is arranged in a plane at substantially 45° to the general plane of the display tube sloping downwardly and outwardly from near the upper edge of the display tube. Above an aperture 45 in the upper surface of the hood is arranged a transparent glass or plastic plate 36. The plate 36 is edge illuminated as indicated diagrammatically by lamps 37 which are arranged in housings so as not to throw any light on the display screen or filter but merely to give edge illumination so that any markings or engravings on the surface of the plate 36 are illuminated. Such markings or engravings in this particular embodiment are arranged on the top surface and the plate is so positioned that a virtual image of this top surface formed by reflection from the outer surface of the circular polarising filter 33 is superimposed on the screen of the display tube 30. The plate 36 in this embodiment is made rotatable and carries a bearing marker or markers thereby providing an adjustable bearing marker display superimposed on the radar display on the screen of the tube. Alternatively the plate 36 may have a graticule, for example a range and bearing graticule.

A chart holder and chart illuminating apparatus is arranged in an assembly 38 above the plate 36, the assembly 38 being pivotally mounted at 49 to permit of access to the top surface of the plate 36 so that, if necessary, information can be written by hand on this top surface to appear as a virtual image on the screen of the cathode ray tube 30. The chart comprises a translucent sheet 39 mounted on rollers 40 so that any required section of a long strip of charts may be positioned as required immediately over and closely adjacent the top surface of the transparent plate 36. The chart is arranged in a removable holder 41 enabling the chart to be withdrawn and replaced as required when it is desired to change a chart. The chart is illuminated by means of lamps 42 the brightness of which may be controlled, a suitable manual control 43 being provided for this purpose. Switch means (not shown) are provided for switching off the lamps 42 completely when it is not required to superimpose any chart display on the radar display. Likewise switch means are provided for switching off the lights 37.

The charts are preferably made black with white markings so that only the markings form images on the display screen.

It is the common practice at the present time to use, for marine radar displays, cathode ray tubes giving an orange afterglow. A black and white chart illuminated by a substantially white light will give the virtual image as white markings which are in marked contrast to the orange colour of the radar display. If it should be required that the markings should be in the same colour as the display or in some other different colour, a suitable coloured filter 44 may be provided beneath the chart. This colour filter may be arranged beneath the transparent member 36 if the markings on that are also to appear in this colour.

The screens of cathode ray tubes used for radar displays are made substantially flat and it has been found that, for most purposes, the curvature of the tube screen can be ignored, a flat chart and transparent member 39 and 36 and a flat circular polariser filter 33 being employed to give a virtual image which can be effectively in the plane of the cathode ray tube and thereby avoiding undesirable parallax effects. If it is required, however, to eliminate any inner parallax effects due to the curvature of the screen of the display tube 30, then a suitable correcting lens may be arranged in the aperture 45.

A meter or indicator or other display device may be incorporated in the top of the hood in the arrangement of FIGURE 3 so that a virtual image is formed by the filter 33 either on the display screen or near the edge of the display. If the hood is of square section and the display screen circular, such an image may conveniently be near one corner of the hood. In operations rooms, the user of a radar display may require to see also information displayed for example on display boards on the walls of the room. For this purpose an aperture may be formed in the top of the hood and a mirror arranged above the aperture so that this mirror together with the front reflecting surface of the circular polarising filter form, in effect, a periscope giving a virtual image of the display board or other information display, this virtual image being positioned either where it does not affect operational use of the display or adjacent the side of the radar display.

I claim:

1. In cathode ray tube display apparatus having a cathode ray tube with a display screen, the combination of a hood extending around and forwardly from the display screen and circularly polarising filter means in front of the display screen within the hood reflecting all incident light from outside the hood in a direction towards said screen onto the internal surface of the hood.

2. Apparatus as claimed in claim 1 wherein the filter is shaped so that all normals to that part of the surface of the filter through which the display on the cathode ray screen can be observed by the viewer extend from the filter to the internal surface of the hood.

3. Apparatus as claimed in claim 1 wherein that part of the internal surface of the hood onto which light is reflected by said filter means is provided with transverse ribs.

4. Apparatus as claimed in claim 1 wherein said fitter means comprises a circularly polarising plate hinged to the hood so that it can be swung out of the way when not required.

5. Apparatus is claimed in claim 1 wherein a door is provided in the hood to permit of access to the cathode ray tube screen behind said filter means.

6. Cathode ray tube display apparatus comprising
   (a) a cathode ray tube having a display screen,
   (b) a circularly polarizing filter arranged in front of the display screen which filter has a flat outer surface,
   (c) a hood extending around the filter and having a viewing aperture facing said screen, the filter being positioned in the hood to reflect any light from outside the hood incident in a direction through the viewing aperture to the display screen onto the inside of the hood, and
   (d) an illuminated information carrying member positioned to reflect from the outer surface of the filter a virtual image of the information carrying member to appear superimposed on and substantially coincident with the screen of the cathode ray tube.

7. Cathode ray tube display apparatus comprising
   (a) a cathode ray tube having a display screen,
   (b) a flat circularly polarizing filter arranged in front of the display screen at an angle to the general plane of the screen,
   (c) a hood extending around the filter and having a viewing aperture facing said screen, the filter being positioned in the hood to reflect any light from outside the hood incident towards the display screen onto the inside of the hood, and
   (d) an illuminated information carrying member arranged in a plane at twice the aforesaid angle to the general plane of the display screen and positioned to reflect from the outer surface of the filter a virtual image of the information carrying member to appear super-imposed on and substantially coincident with the screen of the cathode ray tube.

8. Cathode ray tube display apparatus as claimed in claim 7 wherein said circular polarizing filter is arranged at an angle of 45° to the general plane of the screen.

9. Cathode ray tube display apparatus comprising
   (a) a cathode ray tube having a display screen,
   (b) a circularly polarizing filter arranged in front of the display screen, said filter being of circular cylindrical form, and
   (c) a hood extending around the filter and having a viewing aperture facing said screen, the hood having a divergent form in the direction away from the screen and the filter being positioned with its center of curvature inside the hood so that all normals to the surface of the filter extend to the inside surface of the hood.

10. Cathode ray tube display apparatus comprising
    (a) a cathode ray display tube having a display screen,
    (b) a hood extending around and forwardly from the display screen, and
    (c) filter means within and extending across the hood in front of said display screen, said filter means comprising a circularly polarising plate from the front surface of which all normals extend to the internal surface of the hood.

References Cited in the file of this patent
UNITED STATES PATENTS

| | | |
|---|---|---|
| 2,251,984 | Cleaver | Aug. 12, 1941 |
| 2,566,830 | Goldsmith | Sept. 4, 1951 |
| 2,819,459 | Dodd | Jan. 7, 1958 |
| 3,001,015 | Weiss | Sept. 19, 1961 |

FOREIGN PATENTS

| | | |
|---|---|---|
| 817,271 | France | Aug. 31, 1937 |
| 856,256 | France | June 10, 1940 |
| 708,365 | Great Britain | May 5, 1954 |
| 1,163,210 | France | Sept. 23, 1958 |
| 593,760 | Canada | Mar. 8, 1960 |

OTHER REFERENCES

Serial No. 298,906, Deserno (A.P.C.), published May 18, 1943.